United States Patent [19]

Steinberg et al.

[11] 4,450,183
[45] May 22, 1984

[54] PROCESS FOR MANUFACTURING DRIED MEAT EMULSIONS

[75] Inventors: Marvin P. Steinberg, 4 O'Connor Ct., Champaign, Ill. 61820; Theodore S. Lioutas, Urbana, Ill.

[73] Assignee: Marvin P. Steinberg, Champaign, Ill.

[21] Appl. No.: 389,590

[22] Filed: Jun. 18, 1982

[51] Int. Cl.$^3$ .................... A23B 4/04; A23L 1/31
[52] U.S. Cl. .................... 426/646; 426/456; 426/513; 426/517
[58] Field of Search ........... 426/646, 444, 456, 464, 426/465, 471, 473, 513, 517, 519, 810, 641

[56] References Cited

U.S. PATENT DOCUMENTS

| | | | |
|---|---|---|---|
| 2,346,232 | 4/1944 | Piret et al. | 426/646 X |
| 3,062,655 | 11/1962 | Staackmann et al. | 426/464 X |
| 3,759,723 | 9/1973 | Gunson et al. | 426/646 X |
| 4,239,785 | 12/1980 | Roth | 426/513 X |
| 4,384,009 | 5/1983 | Lewis et al. | 426/646 |

FOREIGN PATENT DOCUMENTS

| | | | |
|---|---|---|---|
| 118910 | 9/1944 | Australia | 426/465 |
| 684962 | 4/1964 | Canada | 426/473 |
| 940003 | 10/1963 | United Kingdom | 426/646 |

OTHER PUBLICATIONS

Swift et al., "Comminuted Meat Emulsions," *Food Technology*, 1963, vol. XVII, No. 2, pp. 106–108.
Rust, et al. (1973). In: Meat Curing Principles and Modern Practice (Published by Koch Supplies, Inc.), 4–9.
Schut, (1976). In: Food Emulsions. (Edited by Stig Friberg, Marcel Dekker, Inc.). Chapt. 8, 385–415.
Honikel, (1981a). J. Food Science 46, p. 1.

Primary Examiner—Arthur L. Corbin

[57] ABSTRACT

A process is provided for manufacturing dried meat emulsions employing limited added water and salt together with an aproximately neutral pH. The process results in accelerated drying, greater fat retention, improved rehydration, and better texture of the rehydrated meat emulsion.

7 Claims, 4 Drawing Figures

PROCESS FOR MANUFACTURING DRIED MEAT EMULSIONS

BACKGROUND AND PRIOR ART

Although the manufacture of meat emulsions in the preparation of sausage-type products is an ancient art, and has been carried out on a commercial scale for many years, there has been very little consideration of the drying of such meat emulsions. For sausage-type products, the emulsions are prepared by adding salt and water, usually in the form of ice, and the mixture is subjected to shear-type mixing to form the emulsion, which is then used in the sausage products without moisture removal. Such products necessarily require refrigeration for storage, distribution, and sale.

Recently, the inventors of the present application have been studying the drying of meat emulsions for the preparation of products which can be stored without refrigeration. The first results of these studies are disclosed in the thesis of Theodore S. Lioutas, entitled "Effect of Atmospheric Drum Drying on Beef Emulsions on the Quality of the Dehydrated Meat Product", submitted in 1982, University of Illinois, Urbana, Ill. Mr Lioutas and his Major Professor, Dr. Marvin P. Steinberg, found that the manufacturing of dried beef emulsions was greatly improved by the addition of relatively large amounts of water to the meat mixture. The optimum conditions determined by these earlier studies were with 100% added water and 1% added salt (NaCl) based on the raw red meat.

With respect to meat emulsions, it is known that the amount of salt soluble protein in the formed emulsion relates to the amount of added salt. In producing a fat-in-water emulsion with the water being the continuous phase and fat the discontinuous phase, the water and salt soluble protein emulsify the fat globules by encasing them in a protein film. See Hansen, *Food Tech.*, 14:565 (1960); and Swift et al, *Food Tech.*, 15:468 (1961). However, in the preparation of dried meat emulsions, the addition of excess water has the disadvantage of requiring more heat energy in the drying of the emulsion. Further, the addition of excess salt may be undesirable from a health standpoint, the trend in food products being toward minimal salt content.

SUMMARY OF INVENTION

The present invention is based in part on the discovery that greatly improved results can be obtained when the meat emulsions are dried at an approximately neutral pH. Since post-rigor red meat as conventionally prepared has a pH below 6.0, such as a pH of 5.2 to 5.4, in practicing the process of this invention, an edible alkaline reagent will usually be added to the meat mixture to adjust the pH to a more nearly neutral pH. By this procedure, the drying rate of the emulsion is markedly accelerated, much more fat is retained in the dried emulsion, and the dried product has better properties in use. The dried product rehydrates faster and more completely, and the texture of the rehydrated product is significantly better. Further, these advantages can be obtained with minimal water and salt addition. It is known that the water holding capacity, emulsifying capacity, and solubilization of salt-soluble protein is related to the pH of the meat. See Schut, "*Meat Emulsions, in Food Emulsions*", edited by Frieberg, et al (1976, Marcel Dekker, Inc., N.Y.); Swift et al, *Food Tech.*, 17:106 (1963); and Rust et al, "Meat Curing Principles in Modern Practice", (1973, Dept. An. Sci., Iowa State University, Ames, Iowa). However, there is no known relation between these factors and the rate of drying and fat retention of dried meat emulsions.

REFERENCE TO DRAWINGS

The method of this invention is illustrated by the accompanying drawings, in which.

Figure 4:
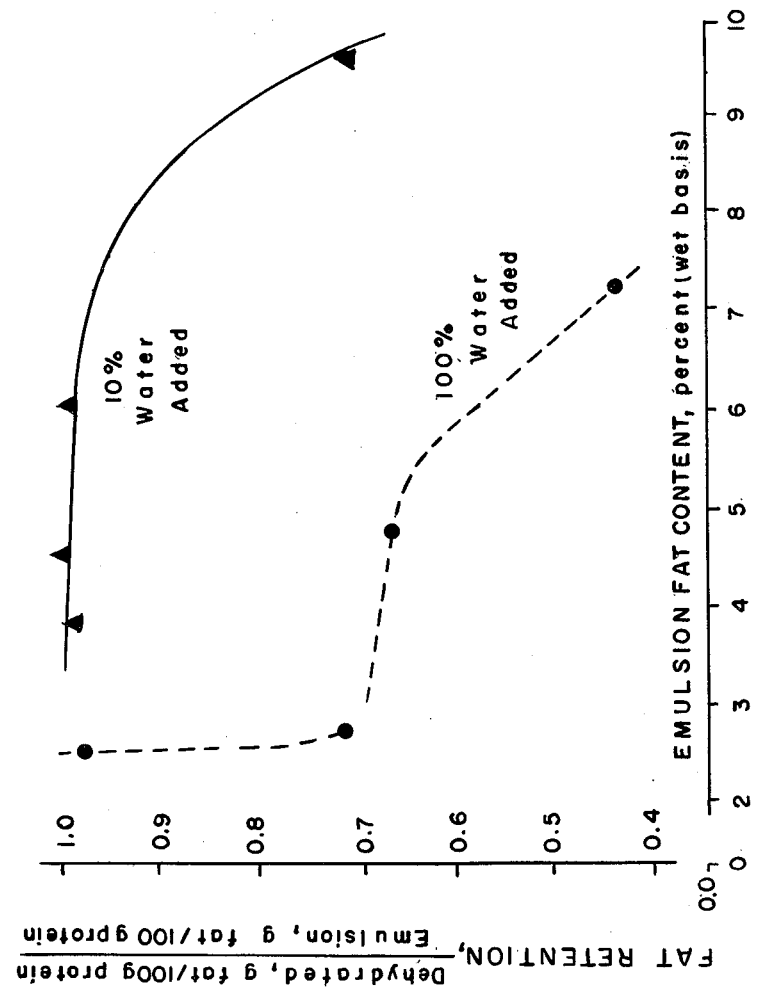
Figure 3:
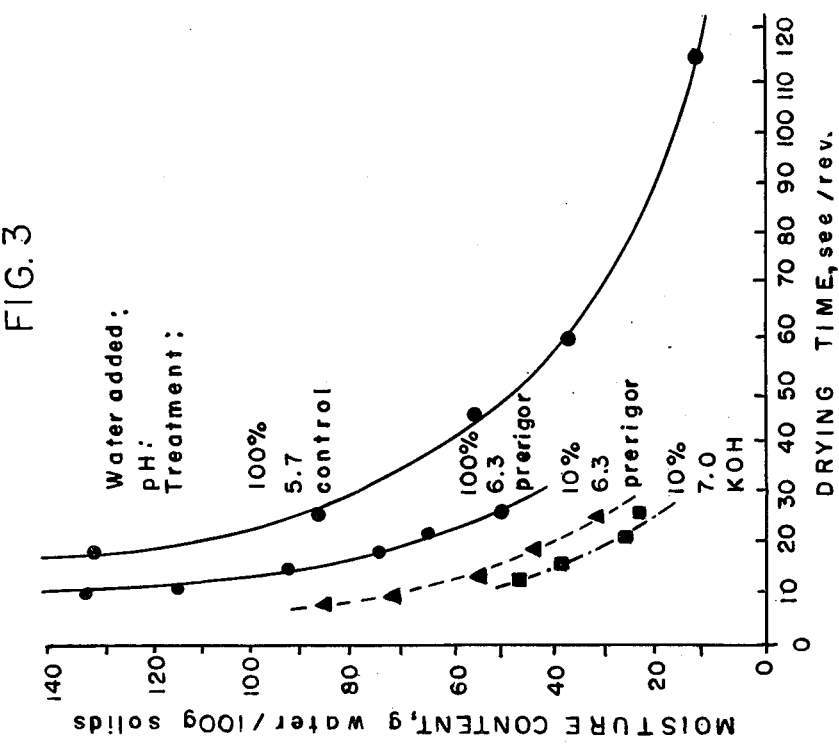

FIG. 3 is a comparative graph showing the effect of pH adjustment on variation of moisture content with drying time for beef emulsion prepared with 1% salt and 10% added water; and FIG. 4 is a comparative graph showing the effect of water and fat addition to beef emulsion adjusted to pH 7.0 with KOH and 1% added salt on fat retention in the dried product.

DETAILED DESCRIPTION

The process of this invention may be practiced with any edible meat, including red meat, poultry meat, and fish. However, the process is believed to be most advantageous when used with post-rigor red meat. Such red meats include beef, pork, and lamb. The pH of edible meat is approximately neutral immediately following the death of the animal. Unless the meat is frozen immediately, the pH decreases rapidly. For example, beef muscle at death may have a pH of about 6.4 to 7.0, but in four hours after slaughter the pH will descrease to 5.2 to 5.4. Most meat, such as post-rigor red meat, will have a storage pH substantially below 6.0. In order to obtain the desired pH in the meat mixture prior to drying, freshly killed meat can be used or meat for which the pH has not dropped below 6.0. However, for convenience of processing, meat used as a starting material for this process would ordinarily be meat which has been stored under conditions at which the pH has fallen well below 6.0. It will therefore be necessary to add an edible alkaline reagent to the meat mixture to obtain the desired pH; namely, a pH within the range from 6.0 to 8.0, and preferably a pH of from 6.5 to 7.5. Any edible alkaline reagent can be used to make the pH adjustment, including hydroxides and alkaline salts. Two reagents which have been found particularly desirable are potassium hydroxide (KOH) and trisodium phosphate ($Na_3PO_4$).

In preparing the meat emulsion, the addition of some salt is desirable. However, the amount of added salt (NaCl) should be limited, such as from 0.2 to 2 parts of salt per each 100 parts of meat. A preferred range for purpose of the present invention is from 0.5 to 1.5 parts of salt per 100 parts of meat. The amount of added water should also be limited, although it is desirable to add some water, especially in the form of ice, to maintain the emulsion at a cool temperature while it is being formed. The amount of added water, which may be all ice or part ice, can range from 0 to 30 parts of water per 100 parts by weight of meat. In a preferred embodiment the water is limited to 5 to 15 parts of water per 100 parts of meat, such as about 10 parts water.

OPERATIONAL EXAMPLE

Figure 2:
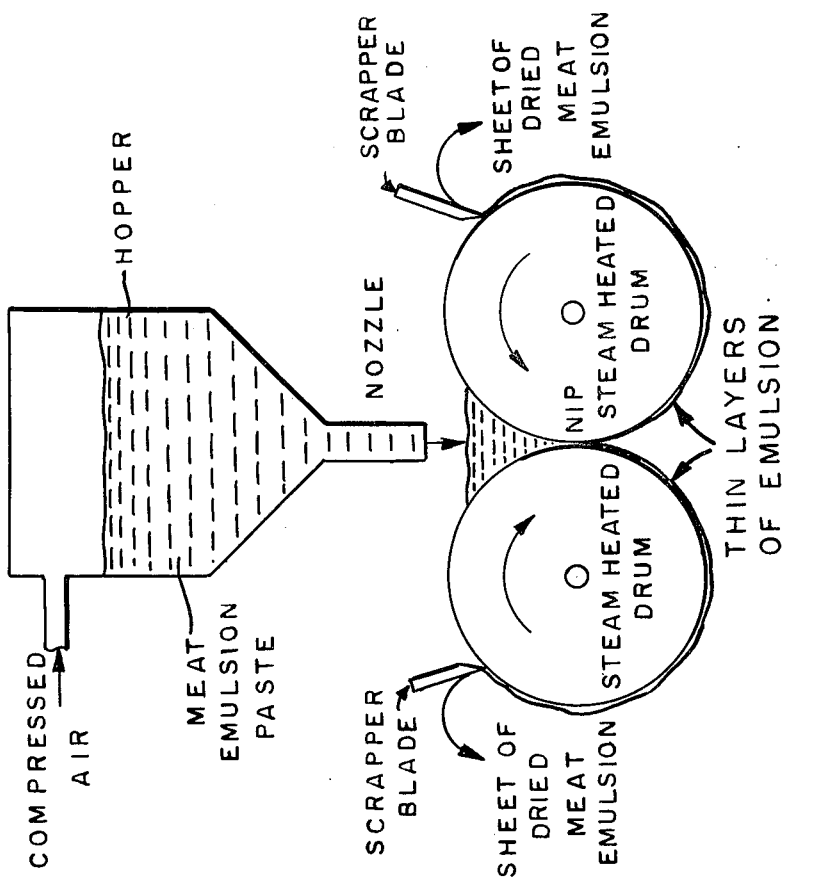
FIG. 2 is a diagrammatic illustration of an apparatus which may be used for forming the emulsion into a dried sheet product.
Figure 1:
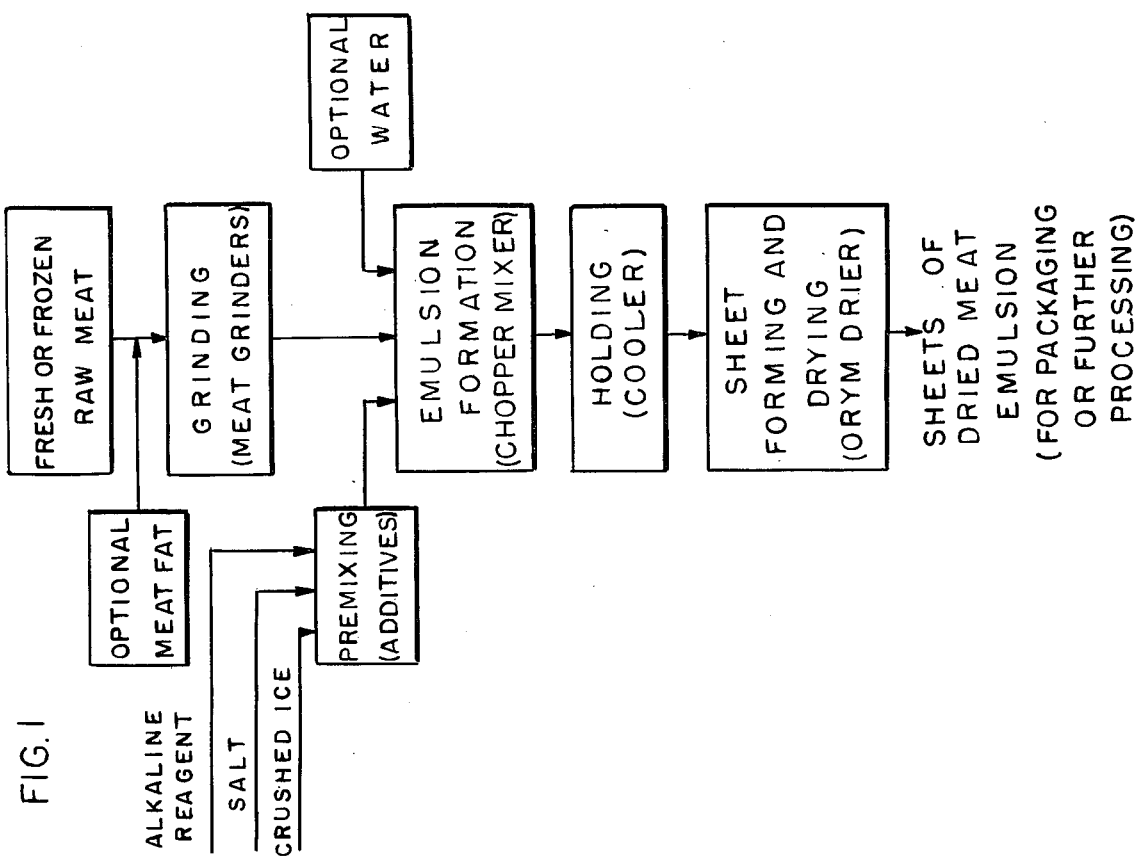
FIG. 1 is a block diagram flow sheet illustrating the method of this invention.

Referring now to FIGS. 1 and 2 of the drawing, the processing steps of this invention will be further described. As shown in FIG. 1, the starting material is non-frozen raw meat, which is preferably post-rigor red meat having a pH substantially below 6.0. Such meat will contain fat, but, optionally, as indicated, more meat fat may be added. In general, it is preferred that the total fat comprise from 6 to 20 parts of fat per each 100 parts by weight of the raw meat. The raw meat, or meat with added fat, is then subjected to grinding, such as with a plurality of meat grinders, to produce a finely-divided fat-containing raw meat starting material. The ground fat-containing meat is then combined with additives. Specifically, as illustrated, these additives comprise an alkaline reagent, salt, and crushed ice. Preferably, as illustrated, the additives are first combined in a premixing operation, and then introduced into the emulsion forming apparatus together with the ground meat. The proportions of the additives will be as described above. In a preferred embodiment, one part of salt and 10 parts of water (as crushed ice) will be used per 100 parts of the fat-containing meat. The alkaline reagent will be potassium hydroxide or trisodium phosphate, and the amount added will be sufficient to adjust the pH of the resulting emulsion to approximately 7.0. If it is desired to increase the moisture content of the emulsion above that obtained by the crushed ice, optional additional water can be added as indicated, but the amount of added water should be limited to less than 30 parts per 100 parts of the raw meat (without added fat), and preferably not over 15 parts of added water.

The emulsion is formed in standard emulsifying apparatus. For example, a chopper-mixer apparatus can be used. The mixing is carried out under shearing conditions and continued until a substantially uniform emulsion paste is obtained. This paste will have a continuous water phase with a dispersed fat phase. During the formation of the emulsion, it is desired to maintain the temperature around 0° C., such as a temperature in the range from $-3°$ to $+5°$ C.

After the formation of the emulsion, it is desirable to hold the emulsion for a short time before it is dried. This holding, may be carried out in a cooler, such as a holding from 30 to 90 minutes at 6° to 10° C. Typically, a holding time of 1 hour and a temperature of 7° C. can be used. After the holding period, the emulsion paste is ready for drying. In certain embodiments, the holding time can be reduced or eliminated.

The emulsion paste is formed into continuous bodies of thin cross-sections, such as in the form of thin sheets or thin strands. The sheets can be formed on drum or roll-type dryers, and the strands can be formed by suitable extrusion apparatus. The formed paste is then dried to a suitable moisture content for the final product. In general, the moisture content can be within the range from 5 to 40% by weight. However, for improved storage under non-refrigerated conditions, while still obtaining optimum properties on rehydration, a moisture content of from 10 to 30% by weight is preferred. With such a moisture content, the dried emulsion can be stored without refrigeration, and will readily rehydrate on being contacted with water.

In FIG. 2, there is shown a diagrammatic illustration of an apparatus for forming the emulsion paste into dried sheets. As shown, the meat emulsion paste is held in a hopper having a bottom converging downwardly to an outlet nozzle. A suitable solids handling valve (not shown) may be provided in association with this nozzle. To force the meat paste through the nozzle, compressed air may be introduced into the head space above the meat emulsion, as indicated. The discharged paste enters the v-shaped zone above the narrow nip of two opposed steam heated drums. The drums rotate downwardly to pass the engaging nip area, the left hand drum rotating clockwise and the right hand drum counter-clockwise, as indicated. For example, the nip spacing may range from about 0.005 to 0.025 inches. By this spacing, thin emulsion layers are formed on the surface of the drums having thicknesses ranging from about 0.01 to 0.05 inches. The emulsion film is thicker than the minimum nip spacing due to expansion on the drums. These thin emulsion layers are dried as the drums rotate toward the scraper blades located at a suitable distance around the drum from the nip. As indicated, the scraper blades engage the surface of the drums so as to remove the dried meat emulsions in the form of sheets. After removal from the drums, the sheets can be further processed, as required, including additional air or heat drying, and cutting or comminution. The resulting product may be in the form of individual sheets, a plurality of superimposed of folded sheets, or the sheets may be broken up to produce flakes, or the assembled layers cut to provide a product in the form of tubes. It will be understood that the final form of the product depends on its ultimate desired use.

EXPERIMENTAL EXAMPLES

The meat used for these tests was a commercial, utility grade, beef round that had been diced and frozen. Our analyses showed close to 70% moisture, wet basis, and 5.1% fat, wet basis. The ice was frozen from zeolite-softened tap water.

This meat was ground in a laboratory size meat grinder through a plate having ⅜ inch diameter holes. The chopper was a "Scharfer type S Senator" of 10 lb. capacity and with one pair of blades. Drying was with a double drum, steam heated drier (FIG. 2). The drums were 6 inch diameter by 7⅜ inch long. Steam pressure in the drums was 60 psig. To prepare the emulsion, meat from the standard stock was thawed overnight and chopped for five minutes; when used, salt, sugar, or ice was added during chopping; at this step the pH was adjusted to 7.0 by the addition of TSP or KOB. The emulsion was then placed in the refrigerator for one hour. Finally, the emulsions were dried on the drum-drier at specified drum speed.

For rehydration, sufficient water was added to increase the moisture content of the samples to 1.8 g water per g meat protein (solids non-fat, non-salt). Contact time was 24 hrs. at 20° C. Finally, the water not absorbed was decanted and weighed; this was subtracted from the total water to obtain rehydration water.

Texture of the samples was evaluated by the Lee-Kramer shear press Model SP-12 IMP (Lee, Incorporated, Washington, D.C.). The 3000 lbs. proving ring was used at three different scales (300 lbs., 100 lbs., and 3000 lbs.). Ten-gram samples were placed in the sample box and force was graphed against time by a Varian SP-12 recorder. Texture was recorded as the maximum peak force in lbs.

EXPERIMENT I

The pH of the living tissue is about 7.0. This drops to about 5.7 in eight hours after slaughter during rigor mortis due to anaerobic decomposition of glycogen in the tissue to lactic acid. The objective here was to test the key concept, namely, that high pH is conducive to rapid drying, with two samples of meat; the first was the diced beef round described just above (normal) and the second was a beef round that was taken within 2 hours of slaughter, frozen and held in the freezer and finally ground from the frozen state (prerigor). The normal beef emulsion showed a pH of 5.7 and the prerigor meat showed a pH of 6.3.

Four emulsions were prepared, all with 1% salt added. Two were made from normal beef; one with 100% water added as recommended in prior art and the other with only 10% water added as ice plus sufficient saturated potassium hydroxide to raise the pH to 7.0. Two were made from prerigor beef, one with 100% water added and the other with only 10% water added as ice. Since no alkali was added to the prerigor beef, both of these samples showed a pH of 6.3.

Each emulsion was dried at several drum speeds and moisture content of the resulting samples was plotted against drying time expressed as reciprocal of drum speed in revolutions per second in FIG. 3. This shows a dramatic effect of pH. At 100% water added, the meat at pH 6.3 dried much faster than that at pH 5.7; for instance, to obtain 40% moisture took 30 seconds for the former and 60 seconds for the latter. Also, at 10% water added, the meat at pH 7.0 dried much faster than that at pH 6.3; for instance, to obtain 40% moisture took 16 seconds for the former and 22 seconds for the latter. It was concluded that pH is a powerful factor controlling drying rate irrespective of whether the higher pH was obtained by taking prerigor meat or by adding alkali to post-rigor meat.

EXPERIMENT II

The question was raised as to how much fat can be emulsified in the meat paste and retained in the dehydrated product. Two emulsion series were prepared; in both, pH was adjusted to 7.0 with KOH and 1% salt was added. The first contained 10% added water and then the fat level was adjusted from 3.51% (control-no external fat added) to 2.7%, 4.7% and 7.2%. (These are the actual measured values after the addition of the fat.) These emulsions were dried on the drum drier; the first series at 2.9 rpm and the second series at 2.3 rpm. The fat content of the dehydrated samples was measured and the fat retained, as a fraction of the fat in the emulsion, was plotted against fat content of the emulsions before drying in FIG. 4.

The difference between the two series is great; at 10% water, fat retention remained essentially complete until the fat content was raised to over 6% emulsion, wet basis, while at 100% water, fat retention decreased to almost 70% with a small fat addition to 2.7%. Retention in case of 10% water did not decrease to this 70% value until fat content was raised to 9.5%. Thus, reduction of water added to 10% enabled the product to retain externally added fat. The dehydrated product at about 20% moisture, wet basis, shows a fat content in the range of 15–18 percent, wet basis.

EXPERIMENT III

In order to investigate the effect of salt addition on the extent of drying, two series of emulsions were prepared, all with 100% water added and with 0, 1, 2, 4 and 6 percent salt added. The pH of one series was adjusted to 7.0 with trisodium phosphate (TSP) and all the samples were dried on the drum drier using a constant speed of 2.3 rpm. The moisture content of the dehydrated samples are shown in Table 1. This shows the moisture content of the samples at pH 7.0 ranged between 8 and 12% for all four salt concentrations, while it ranged from a low of 36% to a high of 92% for the control. This again shows that adjustment of pH to 7.0 resulted in a much faster drying rate.

TABLE 1

| Effect of pH and salt addition on final moisture content | | |
|---|---|---|
| Sample # | % salt added | Moisture content, g water/100 g solids |
| pH 5.7 (Control) | | |
| 1 | 0 | 36.20 |
| 2 | 1 | 92.16 |
| 3 | 2 | 78.35 |
| 4 | 4 | 63.21 |
| 5 | 6 | 53.79 |
| pH 7.0 (adjusted with TSP) | | |
| 6 | 0 | 11.55 |
| 7 | 2 | 7.72 |
| 8 | 4 | 12.23 |
| 9 | 6 | 11.05 |

EXPERIMENT IV

Fat has been shown to contribute to desirable flavor, tenderness and quality of processed meat products. Therefore, it is desirable to minimize any loss during drying. Lioutas (1982, M.S. Thesis, University of Illinois, Urbana) showed that fat emulsification in meat emulsions at the natural pH of 5.7 prepared with 100% water addition depended on the amount of salt added, with maximum retention at 1% addition.

This experiment was repeated here but with pH adjusted to 7.0 by adding trisodium phosphate (TSP). The water addition was 100% and salt added was 0, 1, 2, 4, and 6 percent. After the emulsions were dried, fat content as g fat per 100 g protein was determined and shown in Table 2.

TABLE 2

| Effect of pH on fat content of dehydrated beef | | |
|---|---|---|
| Sample # | Salt Added % | Fat Content g fat/100 g protein |
| pH 5.7 (Control) | | |
| 1 | 0 | 9.16 |
| 2 | 1 | 10.73 |
| 3 | 2 | 8.14 |
| 4 | 3 | 8.08 |
| 5 | 4 | 7.83 |
| 6 | 6 | 7.82 |
| pH 7.0 (TSP) | | |
| 7 | 0 | 8.99 |
| 8 | 1 | 11.87 |
| 9 | 2 | 7.21 |
| 10 | 4 | 7.32 |
| 11 | 6 | 7.96 |

Fat content of the pH 7.0 samples increased to a maximum between zero and 1% salt added and then it dropped off to levels below that for no salt added. It was concluded that one percent salt addition is optimum at pH 7 because it showed best fat retention after drying and represents a low sodium content of a diet including this product.

EXPERIMENT V

Soft texture is always desirable for a meat product. It is mainly controlled by the moisture and fat contents of the sample. Samples of emulsion neutralized to pH 7.0 with potassium hydroxide were prepared with 10% or 100% water added. Each emulsion was dried at four drum speeds. Fat content of dried meat was determined. These were rehydrated and toughness tested in the Shear Press for texture as stated above. The data are in Table 3.

TABLE 3

Effect of amount of water added to beef emulsion at pH 7 on fat content of dehydrated product and texture of rehydrated meat.

| Sample # | Fat Content g fat/100 g protein | Shear Press, lb. |
|---|---|---|
| 10% Water added | | |
| 1 | 15.94 | 177 |
| 2 | 20.68 | 167 |
| 3 | 25.87 | 155 |
| 4 | 29.99 | 148 |
| 100% Water added | | |
| 5 | 17.30 | 193 |
| 6 | 17.69 | 189 |
| 7 | 22.26 | 176 |
| 8 | 26.27 | 165 |

A general trend observed here is that as the fat content of the dehydrated samples increases, their toughness after rehydration decreases. This result was expected and can be attributed to the lubrication properties of the fat globules. More important here, the samples prepared with 10% instead of 100% water addition were more tender at a given fat content after rehydration to the same moisture content.

We claim:
1. The process for manufacturing a dried meat emulsion in thin sheets readily rehydratable to a product with good meat texture, consisting essentially of the following combination of steps:
    (a) combining finely-divided fat-containing raw meat with added salt (NaCl) and added water or ice to form a mixture convertible into a meat emulsion;
    (b) if the pH of said mixture is below 6.0, adjusting the mixture pH to a pH within the range from 6.0 to 8.0 so that the pH of the mixture is similar to the pH of fresh pre-rigor meat;
    (c) converting said raw meat-containing mixture under shearing conditions into a uniform emulsion paste having a continuous water phase and a dispersed fat phase;
    (d) applying said emulsion paste to the exterior surface of an internally heated drum and forming a thin layer thereon; and then
    (e) rapidly drying the applied layer on said drum to a moisture content of from 5 to 40% by weight to obtain the dried meat emulsion.
2. The process of claim 1 in which said meat is post-rigor red meat having a pH below 6.0.
3. The process of claim 1 in which the pH of the meat mixture is below 6.0 and the pH of the mixture is adjusted to a pH of from 6.5 to 7.5.
4. The process of claim 1 in which the amount of added salt is from about 0.5 to 1.5 parts and the amount of added water or ice is from 5 to 15 parts per each 100 parts of the meat.
5. The process of claim 1 in which the pH of said emulsion paste is adjusted to a neutral pH of about 7.
6. The process for manufacturing a dried meat emulsion in thin sheets readily rehydratable to a product with good meat texture, consisting essentially of the following combination of steps:
    (a) combining finely-divided fat-containing post-rigor raw red meat with from about 0.5 to 1.5 parts of added salt (NaCl) and from about 5 to 15 parts of added ice or water per each 100 parts by weight of said meat to form a mixture convertible into a meat emulsion, said mixture having a pH below 6.0 and a total fat content with respect to the fat contained in said raw meat and any added fat of 6 to 20 parts of fat per each 100 parts by weight of the raw meat;
    (b) adjusting the pH of said mixture with an edible alkaline reagent to a pH of from about 6.5 to 7.5;
    (c) converting said raw meat-containing mixture under shearing conditions into a uniform emulsion paste having a continuous water phase and a dispersed fat phase;
    (d) applying said emulsion paste to the exterior surface of an internally heated drum and forming a thin layer thereon;
    (e) rapidly drying the applied layer on said drum to a moisture content at which the product is storable without refrigeration; and then
    (f) removing said dried layer from said drum in continuous sheet form.
7. The process of claim 6 in which said drum is in the form of a pair of internally-heated drums rotating inwardly to a narrow nip therebetween, said emulsion paste being applied to said nip for distribution in thin layers on both of said drums, and in which said dried thin layers are removed from said drums by scraping to obtain the continuous dried sheets.

* * * * *